| United States Patent [19] | [11] Patent Number: 4,816,340 |
| Doi et al. | [45] Date of Patent: Mar. 28, 1989 |

[54] POLYOLEFIN COMPOSITION AND MOLDED ARTICLE OBTAINED THEREFROM

[75] Inventors: Toshiki Doi, Osaka; Hideo Shinonaga; Hideyuki Kuribayashi, both of Chiba, all of Japan

[73] Assignee: Sumitomo Chemical Company, Limited, Japan

[21] Appl. No.: 46,016

[22] Filed: May 5, 1987

Related U.S. Application Data

[63] Continuation-in-part of Ser. No. 785,688, Oct. 9, 1985, abandoned.

[30] Foreign Application Priority Data

Oct. 9, 1984 [JP] Japan ................................ 59-212309
Oct. 9, 1984 [JP] Japan ................................ 59-212310

[51] Int. Cl.$^4$ ...................... B32B 27/40; C08L 95/00
[52] U.S. Cl. .................................. 428/424.8; 524/70; 524/71; 524/74; 524/78
[58] Field of Search ................. 428/424.8; 524/70, 71, 524/74, 78

[56] References Cited

U.S. PATENT DOCUMENTS

| 3,887,756 | 6/1975 | Gerstin et al. .................. 428/424.8 |
| 4,181,689 | 1/1980 | Nagatoshi et al. ................. 525/419 |
| 4,338,228 | 7/1982 | Inoue et al. ....................... 524/120 |
| 4,410,595 | 10/1983 | Matsumoto et al. ......... 428/424.8 X |
| 4,419,408 | 12/1983 | Schmukler et al. ......... 428/424.8 X |

FOREIGN PATENT DOCUMENTS

| 0014018 | 6/1980 | European Pat. Off. . |
| 55-023118 | 2/1980 | Japan .............................. 428/424.8 |
| 55-103955 | 8/1980 | Japan .............................. 428/424.8 |
| 1214748 | 12/1970 | United Kingdom ............. 428/424.8 |

*Primary Examiner*—Thurman K. Page
*Attorney, Agent, or Firm*—Sughrue, Mion, Zinn, Macpeak, and Seas

[57] ABSTRACT

A polyolefin composition and a molded article obtained therefrom are disclosed. The composition comprises a polyolefin and a modified polymer obtained by graft-copolymerizing an unsaturated dicarboxylic acid or an anhydride thereof to a specific ethylene-propylene-based copolymer rubber. The molded article obtained from the composition has an increased impact strength and improved workability in finishing, particularly coating with an urethane coating.

4 Claims, No Drawings

POLYOLEFIN COMPOSITION AND MOLDED ARTICLE OBTAINED THEREFROM

CROSS REFERENCE TO RELATED APPLICATION

This is continuation-in-part application of Ser. No. 785,688, filed Oct. 9, 1985 now abandoned.

FIELD OF THE INVENTION

This invention relates to a polyolefin composition which provides a molded article having improved physical properties, such as impact strength, and easiness in finishing, such as coating, adhesion, filling, printing, hot-stamping, plating, and the like and to a molded article producted from said composition. More particularly, this invention relates to a polyolefin composition obtained by blending a polyolefin with a modified polymer prepared by graft-copolymerizing an unsaturated dicarboxylic acid or an anhydride thereof to a specific ethylene-propylene-based copolymer rubber and to a molded article produced from said composition.

BACKGROUND OF THE INVENTION

Polyolefins have been employed in wide applications because of their excellent mechanical properties, such as rigidity, tensile strength, and the like, chemical resistance, and processability. However, polyolefins involve difficulty in finishing, such as coating, adhesion, filling, printing, hot-stamping, plating, etc., due to their non-polarity, and many attempts have been made to overcome this disadvantage. In particular, studies have been conducted on modification of a surface layer of a polyolefin molded article by physical or chemical processes prior to finishing and put into practical application. These improved processes, however, produce insufficient effects because they require complicated steps or, depending upon etching processes, accompany deformation of molded articles. Therefore, no satisfactory results can be obtained in view of increased cost.

SUMMARY OF THE INVENTION

In order to eliminate the above-described problems, the present inventors have conducted extensive and intensive investigations, and, as a result, have now surprisingly found that a modified polymer obtained by graft-copolymerizing an unsaturated dicarboxylic acid or an anhydride thereof to a specific ethylene-propylene-based copolymer rubber produces a remarkable effect on improvement in the above-described finishing and also improvement in impact strength.

That is, the present invention relates to a polyolefin composition comprising:

(1) from 99.9 to 30 parts by weight, preferably from 99 to 50 parts by weight, and more preferably from 95 to 60 parts by weight, of a polyolefin, and (2) from 0.1 to 70 parts by weight, preferably from 1 to 50 parts by weight, and more preferably from 5 to 40 parts by weight, of a modified copolymer obtained by graft-copolymerizing from 0.1 to 10% by weight of an unsaturated dicarboxylic acid or an anhydride thereof to a copolymer rubber comprising from 10 to 80% by weight of ethylene and propylene or these monomers and an olefin having 4 or more carbon atoms (hereinafter referred to as ethylene-propylene-based copolymer rubber).

Polyolefins have a disadvantage in that they have unsatisfactory adhesiveness to a coating and, in particular, they exhibit no adhesiveness at all to a urethane coating.

As a result of investigations in order to solve this problem, it has also been found that satisfactory adhesion between an olefin resin and a urethane coating can be achieved by using the above-described polyolefin composition without forming an undercoat. The present invention has been completed based on these findings.

DETAILED DESCRIPTION OF THE INVENTION

The polyolefin which can be used in the present invention typically includes polyethylene, polypropylene, an ethylene-propylene copolymer, a propylene-ethylene-butene terpolymer, an ethylene-butene copolymer, polybutene-1, and a combination thereof.

In the present invention, the polyolefin is blended with a modified polymer obtained by graft-copolymerizing an unsaturated dicarboxylic acid or an anhydride thereof to an ethylene-propylene-based copolymer rubber thereby to obtain a polyolefin composition.

The ethylene-propylene-based copolymer rubber which can be used in the present invention has an ethylene content of from 10 to 80% by weight. If the ethylene content is less than 10% by weight, impact resistance of the resulting molded article becomes poor, and with an ethylene content of more than 80% by weight, rigidity of the resulting molded article is reduced. The ethylene-propylene-based copolymer rubber includes an ethylene-propylene copolymer rubber and an ethylene-propylene-non-conjugated diene copolymer rubber.

The olefin having 4 or more carbon atoms which can be used in the ethylene-propylene-based copolymer rubber in combination with ethylene and propylene includes butene-1, pentene-1, 4-methylhexene-1, etc. These olefins are effective to impart viscosity to the polyolefin composition.

The modified polymer according to the present invention can be prepared by known processes, such as a process comprising dissolving an ethylene-propylene-based copolymer rubber in an organic solvent, adding at least one unsaturated dicarboxylic acid or anhydride thereof and a radical generator and heating the mixture with stirring, and a process comprising supplying the above-described components in an extruder to effect graft-copolymerization.

The unsaturated dicarboxylic acid or anhydride thereof which can be used for modification of an ethylene-propylene-based copolymer rubber can be selected from maleic acid, Himic Acid ® (a trademark manufactured by Hitachi Chemical Co., Ltd.), itaconic acid, maleic anhydride, Himic Anhydride ® (a trademark manufactured by Hitachi Chemical Co., Ltd.), itaconic anhydride, and the like. The content of the unsaturated dicarboxylic acid or anhydride thereof in the modified polymer ranges from 0.1 to 10% by weight. If it is less than 0.1% by weight, polar groups contributory to finishing workability are too less to obtain expected effects. On the other hand, contents more than 10% by weight bring unfavorably excessive polarity, sometimes resulting in insufficient compatibility with polyolefins.

The thus prepared modified polymer according to the present invention is not a crystalline resin but a rubbery material having such characteristics that the melting point is 50° C. or lower and that the heat of fusion is 5 cal/g or less.

In general, the melting point and heat of fusion of crystalline polypropylene-based resins or ethylene-propylene-based copolymer resins vary depending on the ethylene content thereof, but the former is in the range of from 145° C. to 165° C., whereas the latter is in the range of from 15 cal/g to 25 cal/g. For example, U.S. Pat. No. 4,338,228 discloses a composition using a modified polyolefin in which a polypropylene-based resin is a base. But, since such a modified polyolefin has a large heat of fusion and is crystalline, the resulting composition is poor in impact strength.

In contrast, the composition comprising a modified polymer according to the present invention is markedly superior in impact strength.

The content of the modified polymer in the polyolefin composition according to the present invention falls within a range of from 0.1 to 70 parts by weight, preferably from 1 to 50 parts by weight, and more preferably from 5 to 40 parts by weight, per 100 parts by weight of the polyolefin composition. The modified polymer contents less than 0.1 part by weight are insufficient to improve finishing workability and impact resistance. While, contents exceeding 70 parts by weight are undesirable because characteristic properties of polyolefins, such as rigidity, tensile strength, etc., are sometimes deteriorated.

Further, it was unexpectedly found that a modified polymer of the aforesaid ethylene-propylene copolymer rubber brings about a higher effect to improve impact strength of polyolefins than the corresponding unmodified ethylene-propylene copolymer rubber.

If necessary, the polyolefin composition according to the present invention may further contain one or more compounds selected from polyhydric alcohols, e.g., trimethylolpropane, 1,6-hexanediol, pentaerythritol, dipentaerythritol, etc. Addition of these compounds sometimes brings about further improved finishing workability, impact resistance, and the like.

In addition, the composition of the present invention may furthermore contain additives, such as styrene-based elastomers, e.g., a styrene-butadiene random copolymer, a styrene-butadiene block copolymer, etc.; various fillers, e.g., glass fiber, talc, wood-meal, calcium carbonate, etc.; antioxidants; weathering agents; and so on.

Blending of the polyolefin and the modified ethylene-propylene-based copolymer rubber can be carried out by conventional techniques, such as Banbury mixing, kneader mixing, roll mixing, continuous mixing by means of a uniaxial or biaxial screw, and the like.

Prior to coating a topcoat on molded articles produced from the polyolefin composition according to the present invention, surface preparation of the molded articles may or may not be conducted. In the former case, surface preparation can be carried out by solvent treatment with halogenated hydrocarbons, low-temperature plasma treatment, corona discharge treatment, flame treatment, alkali degreasing, degreasing with aromatic hydrocarbons or aliphatic alcohols, or a combination of these techniques.

The halogenated hydrocarbons used in the aforesaid solvent treatment are not favorable from the standpoint of working environment but have their own merits of freedom from a fire danger because of their flame retardancy or incombustibility. Examples of the halogenated hydrocarbon solvents are methylene chloride, chloroform, carbon tetrachloride, 1,1,1-trichloroethane, tetrachloroethylene, trichloroethylene, methylene bromide, bromoform, Freon IB, Freon BF, etc.

The solvent treatment with these halogenated hydrocarbons can be carried out by steaming, wiping, immersion, or the like, but it is preferable for uniform workability that the molded articles are immersed in these solvents or steamed with vapors of these solvents. In preferred embodiments, the polyolefin molded articles are treated with the halogenated hydrocarbon solvent by immersion or washing with vapors thereof at 60° C. to 100° C. for 5 to 120 seconds, and more preferably at 70° C. to 90° C. for 15 to 60 seconds.

The low-temperature plasma treatment is carried out by exciting a gas, e.g., oxygen, nitrogen, argon, helium, etc., and preferably oxygen, having a pressure of 10 mmHg or less and preferably from 0.1 to 10 mmHg, by discharge, such as glow discharge, high-frequency discharge, etc., to generate plasma and placing a molded article obtained from the polyolefin composition in the thus produced plasma atmosphere. The strength of the plasma treatment should be such that the surface wet tension of the molded article immediately after the treatment is at least 38 dyn/cm. If the surface wet tension is less than that, the effect on adhesion cannot be manifested. If the treating strength is too high, degradation of the surface of the polyolefin molded article tends to occur, resulting in reduction of adhesive strength. Accordingly, the treating strength in the plasma treatment is preferably such that the treated surface of the molded article may have a surface wet tension ranging from 38 to 65 dyn/cm and more preferably from 42 to 55 dyn/cm.

The alkali degreasing can be effected by applying an alkaline aqueous solution to the surface of a polyolefin molded article by immersion, spraying, or brushing, followed by washing with water and drying. The alkaline aqueous solution used as a degreasing agent includes an aqueous solution of a metal silicate, a metal phosphate, a metal carbonate, sodium hydroxide, potassium hydroxide, etc., with an aqueous solution of a metal silicate, sodium hydroxide, or potassium hydroxide being preferred. The alkaline aqueous solution has a pH of from 9 to 14, and preferably from 11 to 14. Alkaline aqueous solutions having pH values less than 9 show weak degreasing ability so that sufficient adhesive strength to a urethane coating cannot be obtained.

Improved adhesive strength to a urethane coating can be achieved by the above-described surface preparation with an alkaline aqueous solution, but a further ensured improving effect can be produced by washing the molded article with a neutral detergent after the alkali degreasing, washing, and drying. The neutral detergents to be used are generally employed anionic or nonionic surface active agents.

The degreasing treatment with an aromatic hydrocarbon solvent or an alcohol solvent can be performed by wiping the surface of a molded article with such a solvent. The solvent to be used includes toluene, isopropyl alcohol, etc.

The coating to be applied onto the polyolefin molded article with or without surface preparation is a urethane coating having flexibility and includes acrylic urethane, polyester urethane, and other coatings having a urethane structure.

The present invention will now be illustrated in greater detail with reference to the following examples and comparative examples, but it should be understood that the present invention is not limited thereto. In these examples, all parts and percents are by weight unless otherwise indicated.

EXAMPLE 1

An ethylene-propylene rubber (EPR) having an ethylene content of 50% was reacted with maleic anhydride (MAH) in toluene in the presence of a peroxide at 155° C. to synthesize EPR containing 5% of MAH (hereinafter referred to as MAH-modified EPR-1). The thus synthesized MAH-modified EPR-1 was an amorphous rubber so that it did not have a melting point and had a heat of fusion of 0 cal/g.

Twenty parts of MAH-modified EPR-1 and 80 parts of an ethylene-propylene block copolymer having an ethylene content of 7.4% and a melt index of 8 (hereinafter referred to as Block PP) were mixed in a biaxial extruder (manufactured by Ikegai Iron Works, Ltd.), granulated, and then injection-molded to prepare a resin plate having a size of 150'90×2(t) mm.

The resulting resin plate was spray-coated with a urethane coating (Flexthane ® #101, a trademark manufactured by Nippon Bee Chemical Co., Ltd.) as it was or after being subjected to one of the following surface preparations, followed by baking at 120° C for 30 minutes.

Surface Preparation (1) Steaming with 1,1,1-trichloroethane vapor at 74° C. for 30 seconds.
(2) Immersion in an aqueous solution of sodium orthosilicate (NaSiO4) at pH 13.5 at 60° C. for 3 minutes while stirring, followed by washing with water.
(3) Wiping with isopropyl alcohol.

Each of the thus treated plates was evaluated for initial adhesiveness and water-resistance in accordance with the following test methods. The results obtained are shown in Table 1 below.

Test Method (A) Initial Adhesiveness:
The urethane coating film was cross-cut in 2 mm squares, and an adhesive tape of 24 mm in width (Cellotape ®, a trademark manufactured by Nichiban Co., Ltd.) was sticked thereon. The tape was peeled off at a peel angle of 90°, and the percent of squares remaining on the resin plate was determined.

(B) Water-Resistance:
The coated article was soaked in warm water at 40° C. for 240 hours and then subjected to the same peeling test as described in (A) above.

TABLE 1

| Sample No. | Coating Film Property on MAH-Modified EPR-1/Block PP | | |
|---|---|---|---|
| | Surface Preparation | Initial Adhesiveness | Water-Resistance |
| 1 | (1) | 100 | 100 |
| 2 | (2) | 100 | 100 |
| 3 | (3) | 100 | 100 |
| 4 | none | 100 | 100 |

It can be seen from the results of Table 1 above that the urethane coating can firmly be adhered to the surface of the resin plate without an undercoat irrespective of whether surface preparation is conducted or not or irrespective of the type of surface preparation.

COMPARATIVE EXAMPLE 1

Coated resin plates (Sample Nos. 5 to 8) were produced in the same manner as described in Example 1 but using no MAH-modified EPR-1. The coated film was evaluated for initial adhesiveness in the same manner as in Example 1, and the results obtained are shown in Table 2 below.

TABLE 2

| Sample No. | Coating Film Property On Block PP Alone | |
|---|---|---|
| | Surface Preparation | Initial Adhesiveness |
| 5 | (1) | 0 |
| 6 | (2) | 0 |
| 7 | (3) | 0 |
| 8 | none | 0 |

As shown in Table 2 above, the resin plates molded from Block PP alone exhibit no adhesion to an urethane coating at all irrespective of the type of surface preparation.

COMPARATIVE EXAMPLE 2

The same procedures as in Example 1 were repeated except for using MAH-unmodified ethylene-propylene rubber having an ethylene content of 50% (hereinafter referred to as unmodified EPR) in place of MAH-modified EPR-1. The results obtained are shown in Table 3 below.

TABLE 3

| Sample No. | Coating Film Property on MAH-Unmodified EPR/Block PP | |
|---|---|---|
| | Surface Preparation | Initial Adhesiveness |
| 9 | (1) | 10 |
| 10 | (2) | 0 |
| 11 | (3) | 0 |
| 12 | none | 0 |

As shown in Table 3, the resin plates molded from MAH-unmodified EPR and Block PP exhibit substantially no adhesion to an urethane coating.

EXAMPLE 2

EPR having an ethylene content of 50% was reacted with MAH in toluene in the presence of a peroxide catalyst at 155° C. to synthesize EPR having an MAH content of 2% (hereinafter referred as to MAH-modified EPR-2). The thus synthesized MAH-modified EPR-2 was an amorphous rubber so that it did not have a melting point and had a heat of fusion of 0 cal/g.

Thirty parts of MAH-modified EPR-2 and 70 parts of Block PP were mixed, granulated, and injection-molded in the same manner as described in Example 1 to prepare resin plates (150×90×2(t) mm).

The resulting plate was subjected to low-temperature plasma treatment by means of a microwave plasma generator so as to have a surface wet tension of from 48 to 50 dyn/cm. The thus treated plate was spray-coated with Flexthane ® #101 and baked in the same manner as in Example 1.

The coated film was evaluated for initial adhesiveness and water-resistance in the same manner as in Example 1. As a result, no peeling of the coating film was observed.

EXAMPLE 3

The same procedures as in Example 1 were repeated except for using a polyester urethane coating ("R263", manufactured by Nippon Bee Chemical Co., Ltd.) and baking the coating film at 80° C. for 40 minutes. As a result, no peeling was observed in any case.

EXAMPLE 4

The same resin plate as prepared in Example 1 was adhered to a polyvinyl chloride sheet using an NBR type adhesive ("#545" manufactured by Cemedine Co., Ltd.). The peel strength of the resulting laminate was determined at 23° C., at a peel angle of 180°, and at a rate of pulling of 50 mm/min, and was found to be 1.8 kg/inch.

COMPARATIVE EXAMPLE 3

The same procedures as described in Example 5 were repeated except for using no MAH-modified EPR-1. As a result, the laminate showed a peel strength of 0.6 kg/inch at a peel angle of 180°.

EXAMPLE 5

The same resin plate as prepared in Example 1 was hot-stamped using a hot stamping foil having a gold-colored deposited film (produced by Kurz Japan Co., Ltd.) and a hot stamping die having letters (5 mm in width) relief-engraved thereon at a temperature of 170° C.

An adhesive tape (Cellotape ®, a trademark manufactured by Nichiban Co., Ltd.) having a width of 24 mm was stuck fast to the hot-stamped plate with fingers and then rapidly peeled off to evaluate adhesiveness of the foil to the plate.

As a result, the percent remaining of the hot-stamped foil was 100%.

COMPARATIVE EXAMPLE 4

The same procedures as described in Example 6 were repeated except for using no MAH-modified EPR-1. As a result, the percent remaining of the hot-stamped foil was 70%.

EXAMPLE 6

EPR having an ethylene content of 50% was reacted with MAH in toluene in the presence of a peroxide at 155° C. to synthesize MAH-modified EPR-3 having an MAH content of 0.5%.

Forty parts of MAH-modified EPR-3 and 60 parts of Block PP were mixed, granulated, and injection-molded in the same manner as in Example 1 to prepare a resin plate having a size of 150×90×2(t) mm.

The resulting resin plate was coated, baked, and evaluated for initial adhesiveness and water-resistance in the same manner as in Example 1. As a result, no peeling of the coated film was observed.

EXAMPLE 7

Twenty parts each of MAH-modified EPR-1, 2, and 3 and 80 parts of Block PP were blended and molded. Each of the resulting polyolefin molded articles was subjected to Izod impact test at 23° C. (ASTM D256) (hereinafter the same) and was found to have an Izod impact strength (notched) of 44.2, 51.1, and 46.3 kg.cm/cm, respectively.

COMPARATIVE EXAMPLE 5

Twenty parts of the same unmodified EPR as used in Comparative Example 2 and 80 parts of Block PP were blended and molded. The Izod impact strength (notched) of the resulting molded article was found to be 20.9 kg.cm/cm.

COMPARATIVE EXAMPLE 6

The molded article produced from Block PP alone as used in Example 1 was found to be 6.4 kg.cm/cm.

COMPARATIVE EXAMPLE 7

An ethylene-propylene block copolymer having an ethylene content of 12% and a melt index of 2 was reacted with MAH in toluene in the presence of a peroxide at 165° C. to obtain a block copolymer having an MAH content of 2% (hereinafter referred to as MAH-modified PP). The thus synthesized MAH modified PP had a melting point of 162° C. and a heat of fusion of 17 cal/g.

Thirty parts of MAH-modified PP and 70 parts of a Block PP were mixed, granulated, and injection-molded in the same manner as in Example 1. The resulting resin plate was subjected to surface preparation, coated, and evaluated in the same manner as in Example 1. As a result, no peeling of the coated film was observed. But the Izod impact strength (notched) of the resulting molded article was found to be 8.3 kg.cm/cm.

While the invention has been described in detail and with reference to specific embodiments thereof, it will be apparent to one skilled in the art that various changes and modifications can be made therein without departing from the spirit and scope thereof.

What is claimed is:

1. A polypropylene composition consisting essentially of:
   (1) from 95 to 50 parts by weight of a polypropylene and
   (2) from 5 to 50 parts by weight of a modified copolymer rubber obtained by graft-copolymerizing from 0.1 to 10% by weight, based on the modified copolymer rubber, of an unsaturated dicarboxylic acid or an anhydride thereof to a copolymer rubber having a melting point of 50° C. or lower and a heat of fusion of 5 cal/g or less, consisting essentially of ethylene and propylene or these monomers and an olefin having 4 or more carbon atoms and having an ethylene content of from 10 to 80% by weight.

2. A polypropylene molded article with a urethane coating, wherein said molded article is obtained from a polypropylene composition consisting essentially of:
   (1) from 95 to 50 parts by weight of polypropylene and
   (2) from 5 to 50 parts by weight of a modified copolymer rubber obtained by graft-copolymerizing from 0.1 to 10% by weight, based on the modified copolymer rubber of an unsaturated dicarboxylic acid or an anhydride thereof to a copolymer rubber having a melting point of 50° C. or lower and a heat of fusion of 5 cal/g or less, consisting essentially of ethylene and propylene or these monomers and an olefin having 4 or more carbon atoms and having an ethylene content of from 10 to 80% by weight.

3. A molded article as in claim 2, wherein the coating further includes a coating obtained by surface preparation of the molded article.

4. A molded article as in claim 3, wherein said surface preparation is solvent treatment with a halogenated hydrocarbon, low-temperature plasma treatment, corona discharge treatment, flame treatment, alkali degreasing, or degreasing with an aromatic hydrocarbon or an aliphatic alcohol.

* * * * *